No. 785,123. Patented March 21, 1905.

UNITED STATES PATENT OFFICE.

ROBERT E. SCHMIDT, OF ELBERFELD, GERMANY, ASSIGNOR TO FARBEN-FABRIKEN OF ELBERFELD CO., OF NEW YORK, N. Y., A CORPORATION OF NEW YORK.

GREEN ANTHRAQUINONE DYE.

SPECIFICATION forming part of Letters Patent No. 785,123, dated March 21, 1905.

Application filed December 20, 1904. Serial No. 237,708.

*To all whom it may concern:*

Be it known that I, ROBERT E. SCHMIDT, doctor of philosophy, chemist, residing at Elberfeld, Germany, (assignor to the FARBENFABRIKEN OF ELBERFELD CO., of New York,) have invented a new and useful Improvement in New Anthraquinone Dyestuff; and I hereby declare the following to be a clear and exact description of my invention.

My invention relates to the manufacture of a new dyestuff which can be obtained by treating with formic aldehyde and sulfuric acid the green dyestuff obtainable by heating 1-4-diamido-2-3-dibromoanthraquinone with cupric chlorid, nitrobenzene, and sodium acetate, and being most probably a hydrazin of the formula:

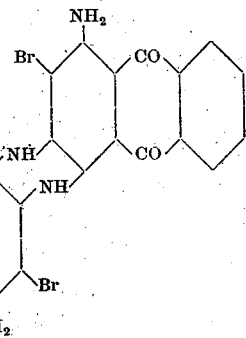

(United States Patent No. 775,367, dated November 22, 1904.)

In carrying out my process practically I can proceed as follows, the parts being by weight: Ten parts of the above-mentioned hydrazin obtainable from 1-4-diamido-2-3-dibromoanthraquinone are dissolved in two hundred parts of sulfuric acid, (66° Baumé.) To the resulting solution ten parts of a forty-per-cent. solution of formic aldehyde are slowly added on stirring and on taking care that the temperature does not rise higher than 50° to 80° centigrade. It is stirred for some hours at this temperature until flakes of a yellowish-green color are obtained on pouring a test portion into water. When the reaction is thus proved to be complete, the mass is stirred into two thousand parts of water, and the precipitate thus obtained is filtered off and washed with water. The new dyestuff is thus obtained in the shape of a dark-green paste suitable for dyeing in the "vat." After being dried and pulverized the coloring-matter forms a greenish-black powder. It is scarcely soluble in boiling quinolin and with a bluer color than the initial material. It is dissolved by concentrated sulfuric acid, with a yellowish-green color, yellowish-green flakes being obtained on pouring this solution into water. Upon treatment with hydrosulfite of sodium and caustic-soda lye it is transformed into its hydroproduct, a violet-blue vat being thus obtained which dyes cotton pure-green fast shades.

Having now described my invention and in what manner the same is to be performed, what I claim as new, and desire to secure by Letters Patent, is—

The herein-described new dyestuff which can be prepared by treating with formic aldehyde and sulfuric acid the product obtainable by heating 1-4-diamido-2-3-dibromoanthraquinone with cupric chlorid, nitrobenzene and sodium acetate, which dyestuff forms after being dried and pulverized a greenish-black powder soluble in concentrated sulfuric acid with a yellowish-green color; being transformed into its hydrocompound on suitable reduction with hydrosulfite and caustic-soda lye, the violet-blue alkaline solution thus obtained exhibiting the typical properties of a "vat" which dyes unmordanted cotton green shades, substantially as hereinbefore described.

In testimony whereof I have signed my name in the presence of two subscribing witnesses.

ROBERT E. SCHMIDT.

Witnesses:
OTTO KÖNIG,
HEINR. AHLEFELDER.